US005320872A

United States Patent [19]

McNeel et al.

[11] Patent Number: 5,320,872
[45] Date of Patent: Jun. 14, 1994

[54] METHOD FOR THE REDUCTION OR PREVENTION OF TANNIN-STAINING ON A SURFACE SUSCEPTIBLE TO TANNIN-STAINING THROUGH THE USE OF A COMPLEXING AGENT FOR A TRANSITION-METAL ION AND COMPOSITIONS CONTAINING SUCH A COMPLEXING AGENT

[75] Inventors: Thomas E. McNeel, Memphis; James A. Harrell, Germantown, both of Tenn.

[73] Assignee: Buckman Laboratories International, Inc., Memphis, Tenn.

[21] Appl. No.: 558

[22] Filed: Jan. 4, 1993

Related U.S. Application Data

[63] Continuation of Ser. No. 603,397, Oct. 26, 1990, abandoned.

[51] Int. Cl.$^5$ ................................................. B05D 3/02
[52] U.S. Cl. ........................................ 427/393; 427/325; 427/408
[58] Field of Search ............... 106/18, 15; 427/393, 427/325, 297, 408, 419.8, 393.4, 440, 444

[56] References Cited

U.S. PATENT DOCUMENTS

| | | | |
|---|---|---|---|
| 2,031,973 | 2/1936 | Mudge | 427/444 |
| 2,818,344 | 12/1957 | Buckman | 106/18.29 |
| 3,033,700 | 5/1962 | Buckman et al. | 106/462 |
| 3,085,893 | 4/1963 | Buckman et al. | 106/450 |
| 3,214,398 | 10/1965 | Vannoy | 524/313 |
| 3,473,947 | 10/1969 | Story | 427/419.8 |
| 3,808,037 | 4/1974 | Story | 427/419.8 |
| 3,900,619 | 8/1975 | Lalk et al. | 427/408 |
| 3,900,620 | 8/1975 | Gilman et al. | 427/408 |
| 4,021,398 | 5/1977 | Gilman et al. | 260/29.6 |
| 4,218,516 | 8/1980 | Meyer et al. | 427/325 |
| 4,238,282 | 12/1980 | Hyde | 162/79 |
| 4,404,239 | 9/1983 | Grunewalder | 427/393 |
| 4,510,074 | 4/1985 | Nakai et al. | 252/400 R |
| 4,522,972 | 6/1985 | Mondt et al. | 524/548 |
| 4,585,703 | 4/1986 | Taguchi et al. | 427/440 |
| 4,732,817 | 3/1988 | Lotz et al. | 427/440 |
| 4,781,948 | 11/1988 | Caldwell | 427/388.1 |
| 4,814,209 | 3/1989 | Arnold | 427/407.1 |
| 4,871,473 | 10/1989 | Goettsche | 427/440 |
| 4,889,811 | 12/1989 | Christner et al. | 8/94.15 |
| 4,935,061 | 6/1990 | French et al. | 252/400.23 |
| 4,957,658 | 9/1990 | French et al. | 252/400.23 |
| 4,988,545 | 1/1991 | Laks | 427/440 |
| 5,051,283 | 9/1991 | Beane et al. | 427/419.8 |
| 5,141,784 | 8/1992 | Beane et al. | 427/408 |

FOREIGN PATENT DOCUMENTS

| | | | |
|---|---|---|---|
| 0035316 | 9/1981 | European Pat. Off. | C09D 5/02 |
| 1450916 | 9/1976 | United Kingdom | C09D 5/08 |

OTHER PUBLICATIONS

J. J. McGuinness and N. Bradford Brakke, "Methods Questioned In New England Study", vol. 54, No. 688, p. 101, May 1982.

"Design Of Waterborne Coatings For The Corrosion Protection Of Steel", vol. 54, No. 684, pp. 63–68, Jan. 1982.

Primary Examiner—Shrive Beck
Assistant Examiner—Diana Dudash
Attorney, Agent, or Firm—Finnegan, Henderson, Farabow, Garrett & Dunner

[57] ABSTRACT

Discoloration of surfaces, such as painted or treated wood surfaces, by tannin-staining caused by the complexing of certain transition metal ions with tannate ions (the process is often referred to in the art as "tannin-stain bleed") is reduced or prevented by contacting a transition metal ion on a painted surface or surface to be painted with a complexing agent for the transition metal ion, such as by the addition of the complexing agent for the transition-metal ion to paint formulations or by pretreatment of the wood surface with the complexing agent before painting. It is believed that the complexing agents form coordination complexes with transition-metal ions on the surface of and within the paint film, thus preventing the formation of highly-colored complexes of the transition metal ions with the tannate ions derived from the tannins in the wood. This technique is applicable to all woods and other surfaces susceptible to tannin-staining and especially to stain-susceptible woods such as redwood and cedar. Using appropriate formulation or application techniques, the method may be used with water-based or solvent-based paints.

27 Claims, No Drawings

METHOD FOR THE REDUCTION OR PREVENTION OF TANNIN-STAINING ON A SURFACE SUSCEPTIBLE TO TANNIN-STAINING THROUGH THE USE OF A COMPLEXING AGENT FOR A TRANSITION-METAL ION AND COMPOSITIONS CONTAINING SUCH A COMPLEXING AGENT

This application is a continuation of application Ser. No. 07/603,397 filed Oct. 26, 1990, now abandoned.

FIELD OF THE INVENTION

The present invention relates to a method for the reduction or prevention of staining of a surface susceptible to tannin-stain, such as a painted or treated wood surface, by the highly-colored complexes that ar formed by the combination of tannate ions derived from tannins, for example, from the surface of wood, with traces of a transition-metal ion from the wood, the paint, or the environment.

BACKGROUND OF THE INVENTION

When primers and paints are used over untreated wood, a problem is often encountered in which tannin from the surface of the wood is seen to bleed through the paint and discolor the finish. Tannin is not a single compound but a complex group of compounds that occur naturally in wood and other plant materials. Since the chemical structures of the tannins vary from one species of wood to another, the intensity of the color of the tannin and the severity of the problem of tannin-stain bleed will likewise vary with the species of wood used. Cedar and redwood are two common types of wood subject to severe tannin-stain bleed.

As used in the art, the term "tannin-stain bleed" refers to the complexation of a transition metal ion by a tannate ion derived from tannin. In particular, largely composed of acidic compounds, tannins will dissolve in alkaline liquids (such as water-based paints) to form water-soluble tannate salts, which are known to form highly-colored water-soluble or water-dispersible complexes with certain transition-metal ions, such as ferric ions. These tannate salts and complexes can diffuse through the paint film before it has initially dried and also can be carried through the water-permeable dried paint film by rainwater.

There are a number of paint additives that are commonly used in an effort to control the problem of tannin-stain bleed. All of these additives contain cations that will form lightly-colored water-insoluble compounds with the tannate ions to prevent their migration through the paint film. For many years, pigments containing lead compounds were used for this purpose, as described in U.S. Pat. No. 3,214,398 (the disclosure of which is incorporated herein by reference); however, the toxicity of lead compounds has virtually eliminated their use for this purpose. U.S. Pat. No. 4,218,516 describes the use of magnesium hydroxide to form a leach-resistant magnesium hydroxide-tannin complex. U.S. Pat. Nos. 2,818,344; 3,085,893; and 3,033,700 (the disclosures of which are incorporated herein by reference) describe the use of barium metaborate to prevent tannin-stain bleed as well as other types of discoloration. With this compound the barium ions would form an analagous barium-tannin complex that would be insoluble in water. Other pigments containing alkaline earth metals (such as calcium barium phosphosilicate as well as other calcium compounds or strontium compounds) would be expected to react with and precipitate tannins in a similar manner.

Water-soluble basic aluminum salts (such as halides, nitrates, formates, sulfates, and phenolsulfonates as well as double salts containing these anions) are used in another type of paint additive for tannin-stain blocking. The use of these basic aluminum salts for this purpose is disclosed in U.S. Pat. Nos. 3,900,620 and 4,021,398. Aluminum hydroxide is known to be amphoteric and is cationic in the basic aluminum salts described in these patents. In this cationic form, basic aluminum hydroxide would precipitate the tannate anions on the surface of the wood and thus prevent tannin-stain bleed.

S-aryl cycloaliphatic sulfonium compounds are described in U.S. Pat. No. 3,900,619 as additives for the prevention of tannin-stain bleed. Applied in this manner, the sulfonium cations would form insoluble ion pairs with the tannate ions on the surface of the wood, thus immobilizing the tannin.

All of these additives use organic or inorganic cations to form water-insoluble precipitates with the tannate ions on the surface of the wood to prevent tannin-stain bleed. It is not believed that the art has recognized that much of the tannin-stain color could arise from the formation of water-soluble or water-dispersible complexes of transition-metal ions (such as ferric ions) with the tannate ions.

The color of the ferric-tannin complex is so intense that only a trace amount of the metal ion would be necessary to produce a visible stain on a white paint film. Trace (ppm) levels of ferric ions can be introduced from a number of sources, including the wood itself as well as the paint. Corrosion of metal fasteners such as nails or screws can also be sources of trace amounts of ferric ion. All of the conventional tannin-stain blocking agents discussed above are used to control the solubility of the tannin but do not control the concentration of trace amounts of ferric ion or other transition-metal ions in the paint film or on its surface.

DESCRIPTION OF THE INVENTION

Broadly speaking, the present invention provides a method for reducing tannin-staining on a surface susceptible to tannin-staining comprising the step of contacting a transition metal ion on the surface with a complexing agent for the transition metal ion, the complexing agent being present in an amount effective to reduce the tannin-staining.

The present invention also provides a method for reducing, and most preferably, preventing, tannin-staining in paint films by using a compound that will form a coordination complex with a transition-metal ion, especially ferric ion, and thus will either prevent the ion from forming a highly-colored complex with the tannate ion from the wood or will reduce the number of ions that will form highly-colored complexes with the tannate ion from the wood. One or more of these compounds may be used to pretreat the wood before painting or may be incorporated into the paint formulation.

More specifically, the invention is directed to a method of reducing tannin-staining on a painted surface comprising the steps of:

adding a complexing agent for a transition metal ion to a paint formulation, the complexing agent being present in an amount effective to reduce tannin-staining; and applying the paint formulation to a surface.

The invention is also directed to a method of reducing tannin-staining on a surface susceptible to tannin-staining comprising the steps of:

coating a surface with a solution containing a complexing agent for a transition metal ion, the complexing agent being present in an amount effective to reduce tannin-staining;

allowing the coated surface to dry; and painting the surface.

In other words, pretreatment of a surface susceptible to tannin-staining with a solution containing the complexing agent is contemplated.

The invention also relates to a paint formulation comprising a complexing agent for a transition metal ion, the complexing agent being present in the paint formulation in an amount effective to reduce tannin-staining. Representative paint formulations include vinyl-acrylic resins, such as UCAR 367 resin product, acrylic interpolymers, such as UCAR 503 resin product, and acrylic resins, such as MV-23 product, manufactured by Rohm & Haas.

Preferably, the paint formulation contains the complexing agent for transition metal ions in an amount sufficient for prevention of tannin-staining. For any given surface or for any given treatment of the surface, one skilled in the art can readily determine amounts of the complexing agent sufficient for reducing or preferably even preventing tannin-staining. Preferably the amount of complexing agent in either a pretreatment solution or in a paint formulation is 0.25 to 1.0 percent by weight of the solution or formulation.

Exemplary useful complexing agents include one or more compounds such as citric acid, lactic acid, tartaric acid, gluconic acid, glycolic acid, oxalic acid, ethylenediaminetetraacetic acid, nitrilotriacetic acid, (1-hydroxyethylidene)-1,1-bis(phosphonic acid), nitrilotris(methylene)triphosphonic acid, hexamethylene-diaminetetra(methylenephosphonic acid), 2-methylpentanediaminetetra(methylenephosphonic acid), 1,2-diaminocyclohexanetetra(methylenephosphonic acid), and water-soluble ammonium or alkali-metal salts of any of these acids. These complexing agents can be particularly compatible with the water-based paints. More preferred complexing agents are nitrilotris(methylene)-triphosphonic acid, sold as PHOS-2 product and (1-hydroxyethylidene)-1,1-bis(phosphonic acid), sold as BUSPERSE 226 product and the ammonium-neutralized forms of PHOS-2 product and BUSPERSE 226 product.

Preferably the pH of the complexing agent is neutral or basic. More preferable, therefore, is the use of salts of the complexing agents formed by neutralization with common bases. For example, the ammonium salts of nitrilotris(methylene)-triphosphonic acid and (1-hydroxyethylidene)-1,1-bis(phosphonic acid) can provide good tannin-stain prevention.

Preferably, the solubility of the complexing agents of the present invention is such that the complexing agent is soluble in the pretreatment solution or paint formulation but upon binding to the transition metal ion, the resulting complex is insoluble in the solution or formulation. This "solubility window" provides for more efficient removal of the transition metal ions from surfaces susceptible to tannin-staining. Thus, tannin-staining is reduced by lowering the quantity of transition metal ions available to react with the tannins due to the solubility of the complex.

These complexing agents may be used individually or in combination for the reduction or prevention of tannin-stain bleed, or they may be combined with any compound capable of precipitating a tannate ion (tannin precipitant), such as those discussed above, to provide even greater control of the tannin-stain problem. For example, tannin precipitants such as barium metaborate, sold as BUSAN 11-M1 product, and calcium barium phosphosilicate, sold as HALOX BW-100 product, provide increased stain prevention when used in combination with complexing agents as described in this invention.

Likewise, transition-metal complexing agents that are compatible with solvent-based paint formulations may be used to control tannin-stain bleed associated with the use of solvent-based formulations. Complexing agents that are available as solids may be ground into solvent-based paint formulations along with the pigments. The complexing agents (such as lactic acid and glycolic acid) that have some solubility in ketones and/or ethers may be coupled into the formulations as solutions in those solvents.

The performance of the complexing agents in accordance with the present invention is dependent on the specific resin system of the paint formulation used and upon the surface to be painted. Individual surfaces vary in the concentration of tannins on each surface. The amount of complexing agent appropriate for use with a given surface can be readily determined by test painting the surface with paint formulations or treatment solutions having varying amounts of the complexing agent.

In short, it is believed that the complexing agent of the present invention will be a useful additive for controlling tannin-staining in any type of paint, be it solvent-based or water-based. One skilled in the art can readily select paints that will be improved by addition of the complexing agent in accord with the present invention. Although the examples set forth below refer to the use of generic-type paints, the inventors do not believe that the paints exemplified are any better than myriad other paints that could be utilized.

The invention will be further described in the following examples which are intended to illustrate, not limit, the invention.

EXAMPLE 1

A typical vinyl-acrylic latex paint of the formulation shown below was rendered resistant to tannin-stain bleed by adding thereto a complexing agent for transition-metal ions as the tannin-stain blocking additive.

| Paint Formulation | |
|---|---|
| | Percent by Wt. |
| Water | 9.2 |
| BUSPERSE 39 Pigment Dispersant | 0.6 |
| BUBREAK 448 Anti-foaming Agent | 0.3 |
| IGEPAL CTA 639 Wetting Agent | 0.3 |
| Water | 2.3 |
| CELLOSIZE QP-15,000 Thickener | 0.2 |
| TI-PURE R-900 Titanium Dioxide | 18.4 |
| NYTAL 300 Talc | 9.7 |
| UCAR 367 Vinyl-acrylic Resin | 40.3 |
| TEXANOL Coalescent Agent | 1.1 |
| Ethylene Glycol | 2.7 |
| CELLOSIZE QP-15,000 Thickener | 0.2 |
| Water | 14.7 |
| | 100.0 |

Individual paint samples were prepared, each containing one of the following complexing agents: nitrilotris(methylene)triphosphonic acid, the ammonium salt of nitrilotris(methylene)triphosphonic acid,(1-hydroxyethylidene)-1,1-bis(phosphonic acid), the ammonium salt of (1-hydroxyethylidene)-1,1-bis(phosphonic acid), the disodium salt of ethylenediaminetetraacetic acid, ammonium citrate, and a mixture of 2-methylpentanediaminetetra(methylenephosphonic acid) with 1,2-diaminocyclohexanetetra(methylenephosphonic acid).

These tannin-stain blocking agents were added at levels of 0.50, 0.75, and 1.0% of the total weight of the paint. The paint without any tannin-stain inhibitor was used as a negative control.

The paints were then applied to test panels of redwood and cedar siding. Two systems of applying the paints were used: (1) self-primed two-coat application (with tannin-stain blocking agent in both coats); and (2) tannin-stain blocking agent in the primer only and not in the topcoat.

The panels were then exposed in an offset arrangement facing north on the test fence and were observed for staining. Ratings of the degree of tannin-staining of the painted surfaces were made at regular intervals. The tannin-stain blocking was found to be directly related to the concentration of tannin-stain blocking agent used, with a level of 1.0% providing improved results as compared with the negative control that contained no tannin-stain inhibitor.

EXAMPLE 2

A typical acrylic interpolymer paint of the formulation set forth below was rendered resistant to tannin-stain bleed by using a complexing agent for transition-metal ions a the tannin-stain blocking additive.

| Paint Formulation | |
|---|---|
| | Percent by Wt. |
| Water | 9.1 |
| BUSPERSE 39 Pigment Dispersant | 0.5 |
| BUBREAK 448 Anti-foaming Agent | 0.3 |
| IGEPAL CTE-639 Wetting Agent | 0.3 |
| Water | 0.3 |
| CELLOSIZE QP-15,000 Thickener | 0.2 |
| TI-PURE R-900 Titanium Dioxide | 18.2 |
| NYTAL 300 Talc | 9.6 |
| UCAR 503 Acrylic Interpolymer | 37.9 |
| TEXANOL Coalescent Agent | 1.1 |
| Ethylene Glycol | 2.7 |
| CELLOSIZE QP-15,000 Thickener | 0.2 |
| Water | 19.6 |
| | 100.0 |

Individual paint samples were prepared, each containing one of the following complexing agents: nitrilotris(methylene)-triphosphonic acid, the ammonium salt of nitrilotris(methylene)-triphosphonic acid, (1-hydroxyethylidene)-1,1-bis(phosphonic acid), the ammonium salt of (1-hydroxyethylidene)-1,1-bis(phosphonic acid), the disodium salt of ethylenediaminetetraacetic acid, ammonium citrate, and a mixture of 2-methylpentanediaminetetra(methylenephosphonic acid) with 1,2-diaminocyclohexanetetra(methylenephosphonic acid).

These tannin-stain blocking agents were added at levels of 0.50, 0.75, and 1.0% of the total weight of the paint. The paint without any tannin-stain inhibitor was used as a negative control.

The paints were then applied to test panels of redwood and cedar siding. Two systems of applying the paints were used: (1) self-primed two coat application (with tannin-stain blocking agent in both coats); and (2) tannin-stain blocking agent in the primer only and not in the topcoat.

The panels were then exposed in an offset arrangement facing north on the test fence and were observed for staining. Ratings of the degree of tannin-staining of the painted surfaces were made at regular intervals.

The tannin-stain blocking was found to be directly related to the concentration of tannin-stain blocking agent used, with a level of 1.0% providing improved results as compared with the negative control that contained no tannin-stain inhibitor.

EXAMPLE 3

Resistance to tannin-staining was imparted to a typical vinyl-acrylic late paint film of the formulation set forth below by pretreating the wood surfaces with an aqueous solution of a complexing agent for transition metal ions.

| Paint Formulation | |
|---|---|
| | Percent by Wt. |
| Water | 9.2 |
| BUSPERSE 39 Pigment Dispersant | 0.6 |
| BUBREAK 448 Anti-foaming Agent | 0.3 |
| IGEPAL CTA 639 Wetting Agent | 0.3 |
| Water | 2.3 |
| CELLOSIZE QP-15,000 Thickener | 0.2 |
| TI-PURE R-900 Titanium Dioxide | 18.4 |
| NYTAL 300 Talc | 9.7 |
| UCAR 367 Vinyl-acrylic Resin | 40.3 |
| TEXANOL Coalescent Agent | 1.1 |
| Ethylene Glycol | 2.7 |
| CELLOSIZE QP-15,000 Thickener | 0.2 |
| Water | 14.7 |
| | 100.0 |

A 0.2% solution of (1-hydroxyethylidene)-1,1-bis(phosphonic acid) in water was prepared and was brushed onto panels of redwood and cedar siding. The solution was allowed to dry before the two coats of paint (which contained no tannin-stain blocking agents) were applied. The paint was applied over untreated sections of the panels as negative controls.

The panels were then exposed in an offset arrangement facing north on the test fence and were observed for staining. Ratings of the degree of tannin-staining of the painted surfaces were made at regular intervals. The tannin-stain blocking was found to be less effective than that which was observed in Example 1 but still showed improvement over the results obtained with the negative controls.

EXAMPLE 4

Resistance to tannin-staining was imparted to an acrylic interpolymer paint film of the formulation set forth below by pretreating the wood surfaces with an aqueous solution of a complexing agent for transition-metal ions.

| Paint Formulation | |
|---|---|
| | Percent by Wt. |
| Water | 9.1 |
| BUSPERSE 39 Pigment Dispersant | 0.5 |
| BUBREAK 448 Anti-foaming Agent | 0.3 |
| IGEPAL CTE-639 Wetting Agent | 0.3 |
| Water | 0.3 |
| CELLOSIZE QP-15,000 Thickener | 0.2 |

| -continued |  |
| --- | --- |
| Paint Formulation |  |
|  | Percent by Wt. |
| TI-PURE R-900 Titanium Dioxide | 18.2 |
| NYTAL 300 Talc | 9.6 |
| UCAR 503 Acrylic Interpolymer | 37.9 |
| TEXANOL Coalescent Agent | 1.1 |
| Ethylene Glycol | 2.7 |
| CELLOSIZE QP-15,000 Thickener | 0.2 |
| Water | 19.6 |
|  | 100.0 |

A 0.2% solution of (1-hydroxyethylidene)-1,1-bis(-phosphonic acid) in water was prepared and was brushed onto panels of redwood and cedar siding. The solution was allowed to dry before the two coats of paint (which contained no tannin-stain blocking agents) were applied. The paint was applied over untreated sections of the panels as negative controls. The panels were then exposed in an offset arrangement facing north on the test fence and were observed for staining. Ratings of the degree of tannin-staining of the painted surfaces were made at regular intervals. The tannin-stain blocking was found to be less effective than that which was observed in Example 2 but still showed improvement over the results obtained with the negative controls.

What is claimed is:

1. A method for the prevention or reduction of tannin-staining on a dried painted surface comprising the steps of:
   including in a paint formulation containing a resin and a pigment, a complexing agent for a transition metal ion, and a compound different from said complexing agent, said compound being capable of precipitating a tannate ion, said complexing agent being selected from a phosphonic acid and a salt of a phosphonic acid, and said complexing agent being included for the purpose of at least reducing tannin-staining on a dried painted surface and in an amount effective to reduce tannin-staining on said dried painted surface; and
   applying said paint formulation to a wood or other plant material surface and allowing said paint formulation to dry on said wood or other plant material surface, whereby tannin-staining on the resulting dried painted surface is at least reduced.

2. The method of claim 1 wherein said complexing agent is selected from at least one of (i) (1-hydroxyethylidene)-1,1-bis(phosphonic acid); (j) nitrilotris(methylene)triphosphonic acid; (k) hexamethylenediaminetetra(methylenephosphonic acid); (l) 2-methylpentanediaminetetra(methylenephosphonic acid); (m) 1,2-diaminocyclohexanetetra(methylenephosphonic acid); (n) a water-soluble ammonium salt of any of (i)–(m); and (o) an alkali-metal salt of any of (i)–(m).

3. The method of claim 2 wherein said complexing agent is (1-hydroxyethylidene)-1,1-bis(phosphonic acid); a water-soluble ammonium salt of (1-hydroxyethylidene)-1,1-bis(phosphonic acid); or an alkali-metal salt of (1-hydroxyethylidene)-1,1-bis(phosphonic acid).

4. The method of claim 2 wherein said complexing agent is nitrilotris(methylene)triphosphonic acid; a water-soluble ammonium salt of nitrilotris(methylene)triphosphonic acid; or an alkali-metal salt of nitrilotris(methylene)triphosphonic acid.

5. The method of claim 2 wherein said wood or other plant material surface is a wood surface.

6. The method of claim 2 wherein tannin-staining of said painted surface is prevented.

7. The method of claim 2 wherein said paint formulation is a water-based alkaline paint formulation.

8. The method of claim 2, wherein said compound capable of precipitating a tannate ion is selected from the group consisting of magnesium, barium, calcium, strontium and aluminum compounds.

9. The method of claim 3, wherein said compound capable of precipitating a tannate ion is selected from the group consisting of magnesium, barium, calcium, strontium and aluminum compounds.

10. The method of claim 4, wherein said compound capable of precipitating a tannate ion is selected from the group consisting of magnesium, barium, calcium, strontium and aluminum compounds.

11. A method for the prevention or reduction of tannin-staining on a dried painted surface comprising the steps of:
    coating a wood or other plant material surface with a solution containing, for the purpose of at least reducing tannin-staining on a dried painted surface, a complexing agent for a transition metal ion, and a compound different from said complexing agent, said compound being capable of precipitating a tannate ion said complexing agent being selected from a phosphonic acid an a salt of a phosphonic acid, and said complexing agent being present in said solution in an amount effective to reduce tannin-staining on said dried painted surface; and
    thereafter painting said coated surface with a paint formulation containing a resin and a pigment and allowing said paint formulation to dry on said coated surface, whereby tannin-staining on the resulting dried painted surface is at least reduced.

12. The method of claim 11 wherein said complexing agent is selected from at least one of (i) (1-hydroxyethylidene)-1,1-bis(phosphonic acid); (j) nitrilotris(methylene)triphosphonic acid; (k) hexamethylenediaminetetra(methylenephosphonic acid); (l) 2-methylpentanediaminetetra(methylenephosphonic acid); (m) 1,2-diaminocyclohexanetetra(methylenephosphonic acid); (n) a water-soluble ammonium salt of any of (i)–(m); and (o) an alkali-metal salt of any of (i)–(m).

13. The method of claim 14 wherein said complexing agent is (1-hydroxyethylidene)-1,1-bis(phosphonic acid); a water-soluble ammonium salt of (1-hydroxyethylidene)-1,1-bis(phosphonic acid); or an alkali-metal salt of (1hydroxyethylidene)-1,1-bis(phosphonic acid).

14. The method of claim 12 wherein said complexing agent is nitrilotris(methylene)triphosphonic acid; a water-soluble ammonium salt of nitrilotris(methylene)triphosphonic acid; or an alkali-metal salt of nitrilotris(methylene)triphosphonic acid.

15. The method of claim 12 wherein said wood or other plant material surface is a wood surface.

16. The method of claim 12 wherein tannin-stain of said painted surface is prevented.

17. The method of claim 12 wherein said solution contains about 0.2% by weight of said complexing agent.

18. The method of claim 12 wherein the transition metal ion is a ferric ion.

19. The method of claim 12, further comprising the step of allowing the coated surface to dry prior to said painting step.

20. The method of claim 12, wherein said compound capable of precipitating a tannate ion is selected from the group consisting of magnesium, barium, calcium, strontium and aluminum compounds.

21. A method for the prevention or reduction of tannin-staining on a dried painted surface comprising the step of contacting said dried painted surface painted with a paint formulation containing a resin and a pigment, with a complexing agent for a transition metal ion, and a compound different from said complexing agent, said compound being capable of precipitating a tannate ion, for the purpose of at least reducing tannin-staining on said dried painted surface, wherein said complexing agent is selected from a phosphonic acid and a salt of a phosphonic acid, said complexing agent being present in an amount effective to at least reduce tannin-staining on said dried painted surface.

22. The method of claim 21 wherein said complexing agent is selected from at least one of (i) (1-hydroxyethylidene-1,1-bis(phosphonic acid); (j) nitrilotris(methylene)triphosphonic acid; (k) hexamethylenediaminetetra(methylenephosphonic acid); (l) 2-methylpentanediaminetetra(methylenephosphonic acid); (m) 1,2-diaminocyclohexanetetra(methylenephosphonic acid); (n) a water-soluble ammonium salt of any of (i)–(m); and (o) an alkali-metal salt of any of (i)–(m).

23. The method of claim 22 wherein said complexing agent is (1-hydroxyethylidene-1,1-bis(phosphonic acid); a water-soluble ammonium salt of (1-hydroxyethylidene)-1,1-bis(phosphonic acid); or an alkali-metal salt of (1-hydroxyethylidene)-1,1-bis(phosphonic acid).

24. The method of claim 22 wherein said complexing agent is nitrilotris(methylene)triphosphonic acid; a water-soluble ammonium salt of nitrilotris(methylene)triphosphonic acid; or an alkali-metal salt of nitrilotris(methylene)triphosphonic acid.

25. The method of claim 23 wherein said painted surface is a painted wood or other plant material surface.

26. The method of claim 22 wherein tannin-staining is prevented.

27. The method of claim 22, wherein said compound capable of precipitating a tannate ion is selected from the group consisting of magnesium, barium, calcium, strontium and aluminum compounds.

* * * * *

UNITED STATES PATENT AND TRADEMARK OFFICE
CERTIFICATE OF CORRECTION

PATENT NO. : 5,320,872
DATED : June 14, 1994
INVENTOR(S) : Thomas E. McNeel and James A. Harrell It is certified that error appears in the above-identified patent and that said Letters Patent is hereby corrected as shown below:

CLAIM 11, Column 8, line 29, after "tannate ion" insert --,--;

Column 8, line 30, "an" should read --and--.

CLAIM 13, Column 8, line 50, "claim 14" should read --claim 12--;

Column 8, line 54, "(1hydroxyethylidene)" should read --(1-hydroxyethylidene)--

CLAIM 16, Column 8, line 62, "tannin-stain" should read --tannin-staining--.

CLAIM 23, Column 10, line 7, "(1-hydroxyethvlidine-1." should read --hydroxyethylidene)-1, CLAIM 25, Column 10, line 16, "claim 23" should read --claim 22--.

Signed and Sealed this

Twenty-second Day of November, 1994

Attest:

BRUCE LEHMAN

Attesting Officer  Commissioner of Patents and Trademarks